(12) United States Patent
Hagan (10) Patent No.: US 6,327,526 B1
(45) Date of Patent: Dec. 4, 2001

(54) METHOD AND APPARATUS FOR MEASURING THE ROLLOVER RESISTANCE AND COMPLIANCE CHARACTERISTICS OF A VEHICLE

(75) Inventor: Daniel L. Hagan, Oakland, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/631,006

(22) Filed: Aug. 2, 2000

(51) Int. Cl.[7] .................................................. G01M 17/00
(52) U.S. Cl. .............................................. 701/33; 73/65.1
(58) Field of Search .............................. 701/29, 33, 124; 73/865.3, 65.01, 65.07, 669

(56) References Cited

U.S. PATENT DOCUMENTS

| | | |
|---|---|---|
| 3,418,847 | 12/1968 | Nantz . |
| 3,584,503 | 6/1971 | Senour . |
| 3,638,211 | 1/1972 | Sanchez . |
| 3,837,221 * | 9/1974 | Odier ...................................... 73/124 |
| 5,032,821 | 7/1991 | Domanico et al. . |
| 5,136,513 | 8/1992 | Sol et al. . |
| 5,177,998 | 1/1993 | Monk . |
| 5,189,920 | 3/1993 | Martinez . |
| 5,369,974 * | 12/1994 | Tsymberov ......................... 73/11.08 |
| 5,583,777 | 12/1996 | Power . |
| 5,825,284 | 10/1998 | Dunwoody et al. . |
| 6,002,974 | 12/1999 | Schiffman . |
| 6,002,975 | 12/1999 | Schiffman et al. . |
| 6,038,495 | 3/2000 | Schiffman . |

* cited by examiner

Primary Examiner—Michael J. Zanelli
(74) Attorney, Agent, or Firm—Ford Global Tech. Inc.

(57) ABSTRACT

An apparatus 10 for measuring and/or analyzing the rollover resistance and dynamic compliance characteristics of a vehicle 12. Apparatus 10 includes a controller 14, a selectively rotatable test bed assembly 16, several load sensors 18 which are disposed upon test bed assembly 16, suspension jacks or actuators 20, a gravity compensation assembly 22, and various vehicle sensors 24. Controller 14 is communicatively coupled to test bed assembly 16, sensors 18, actuators 20, gravity compensation assembly 22, and vehicle sensors 24. Controller 14 generates signals to test bed assembly 16, actuators 20, and assembly 22, effective to cause test bed assembly 16, actuators 20 and assembly 22 to replicate certain inertial conditions or events. Controller 14 further receives signals from sensors 18 and 24, and processes and utilizes the received signals to analyze and/or measure the resistance of vehicle 12 to rollover and dynamic compliance characteristics of vehicle 12 during the replicated inertial conditions or events.

19 Claims, 7 Drawing Sheets

METHOD AND APPARATUS FOR MEASURING THE ROLLOVER RESISTANCE AND COMPLIANCE CHARACTERISTICS OF A VEHICLE

FIELD OF THE INVENTION

This invention relates to a method and an apparatus for measuring the rollover resistance and compliance characteristics of a vehicle and more particularly, to a method and an apparatus which is adapted to analyze the rollover resistance and compliance characteristics of a vehicle and which provides a full and accurate replication of the dynamic forces that are imparted upon a vehicle during steady-state and transient inertial events.

BACKGROUND OF THE INVENTION

It is desirable to measure and analyze a vehicle's weight transfer and compliance characteristics during certain inertial events in order to gain a better understanding of the vehicle's resistance to rollover and structural compliance attributes. For example and without limitation, understanding a vehicle's resistance to rollover during various inertial events allows the safety devices within a vehicle (e.g., seat belt pretensioners, airbags) to be deployed in a timely and proper fashion to protect the occupants of the vehicle in situations where a rollover may be imminent. Furthermore, this information can be used to modify the vehicle to increase its resistance to rollover in certain situations and/or to meet certain structural compliance requirements or desires.

Efforts have been made to determine and/or analyze a vehicle's resistance to rollover in certain situations and to measure the vehicle's compliance attributes in those situations. Prior efforts include disposing various sensors on a vehicle and causing the vehicle to perform various maneuvers on a test track or in other testing environments. Readings are taken from the sensors which provide information regarding the various forces on the vehicle, the vehicle's speed, turning radius, and other vehicle attributes. This information can then be used to analyze the vehicle's resistance to rollover (e.g., by examining the data received just prior to the vehicle tipping or "rolling over") and/or compliance attributes (e.g., by examining the displacement, stress, strain or bending experienced by portions of the vehicle). While these prior methods provide information relevant to a vehicle's rollover resistance and structural compliance characteristics, they suffer from some drawbacks.

For example and without limitation, because the sensor readings are taken in real time during testing maneuvers, it is difficult, if not impossible, to determine all of the forces acting on the vehicle and/or the vehicle's structural compliance attributes at any one instance in time and/or at a particular inertial state. Particularly, an excessive amount of sensors would have to be deployed on the vehicle and simultaneously monitored. Such an excessive amount of sensors would be difficult to accurately and simultaneously monitor and could, themselves, alter the performance of the vehicle. Hence, prior methods typically use fewer sensors which do not provide sufficient information to fully quantify a vehicle's rollover resistance and structural compliance attributes during certain inertial events.

Applicant's invention addresses these drawbacks and provides a new and improved method and an apparatus for measuring the rollover resistance and dynamic compliance characteristics of a vehicle.

SUMMARY OF THE INVENTION

It is a first object of the invention to provide a method and an apparatus for measuring the rollover resistance and dynamic compliance characteristics of a vehicle which overcomes at least some of the previously delineated drawbacks of the prior systems, devices and/or methods.

It is a second object of the invention to provide a method and an apparatus for accurately measuring the rollover resistance of a vehicle at certain inertial conditions.

It is a third object of the invention to provide a method and an apparatus which allows for a full and accurate replication of the dynamic forces that are imparted upon a vehicle during steady-state and transient events.

It is a fourth object of the invention to provide a method and an apparatus for accurately measuring a vehicle's structural compliance attributes.

According to one aspect of the present invention an apparatus is provided for measuring and analyzing attributes of a vehicle during a certain inertial event. The vehicle includes a plurality of tires and a suspension assembly. The apparatus comprises a test platform on which the vehicle is placed and which is selectively and rotatably positionable in an angular position based upon said inertial event; a plurality of load sensors which are each disposed under a unique one of the plurality of tires and which are adapted to provide data regarding the loads provided by the plurality of tires; a plurality of actuators which are attached to the suspension assembly and which are adapted to selectively hold the suspension assembly in a certain position; and a compensation assembly which is attached to the test platform and to the vehicle, the compensation assembly being effective to selectively provide a force to the vehicle that compensates for a loss of gravitational force that is experienced by the vehicle when the test platform resides in the angular position, thereby cooperating with the test platform to accurately replicate forces that are imparted upon the vehicle during the inertial event and allowing the attributes to be analyzed.

According to a second aspect of the present invention a method is provided for measuring certain attributes of a vehicle during an inertial event, the vehicle having a suspension assembly. The method includes the steps of: causing the vehicle to experience an inertial event; measuring lateral forces on the vehicle when the vehicle experiences the inertial event; monitoring the state of the suspension assembly when the vehicle experiences the inertial event; replicating the state of the suspension assembly by use of a plurality of actuators; placing the vehicle on a test fixture; rotating the test fixture to a certain angular position effective to replicate the measured lateral forces; imparting a vertical force on the vehicle effective to compensate for a loss of gravitational force that is experienced by the vehicle when the test fixture resides in the angular position; and measuring and analyzing the certain attributes of the vehicle.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Referring now to FIGS. 1–4, there is shown a system or apparatus 10 for measuring and/or analyzing the rollover resistance and dynamic compliance characteristics of a vehicle 12 which is made in accordance with the teachings of the preferred embodiment of the invention. As shown, apparatus 10 includes a controller 14, a selectively rotatable test fixture, bed or platform assembly 16, several multi-axial load pads or sensors 18 which are disposed upon test bed assembly 16, several suspension actuators 20, a gravity compensation assembly 22, and various vehicle sensors 24.

Figure 1:
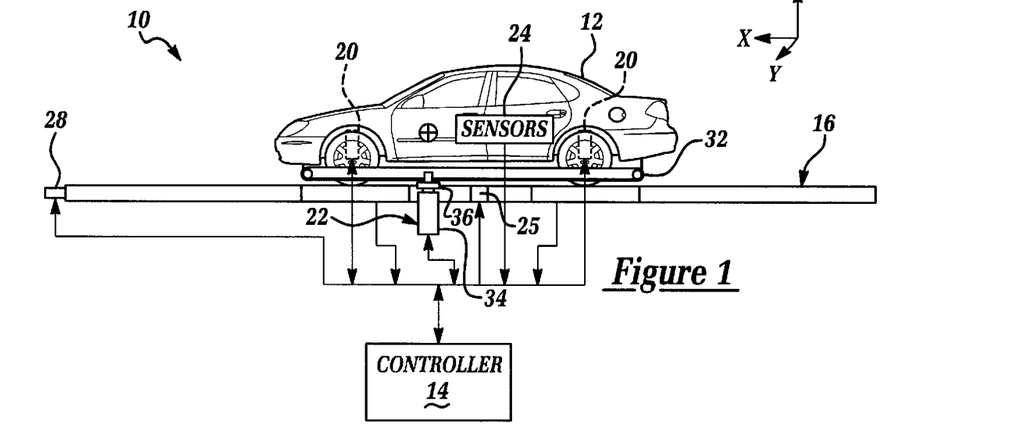
FIG. 1 is a side schematic view of an apparatus for measuring the rollover resistance and compliance characteristics of a vehicle during various inertial events and which is made in accordance with the teachings of the preferred embodiment of the invention.
Figure 2:
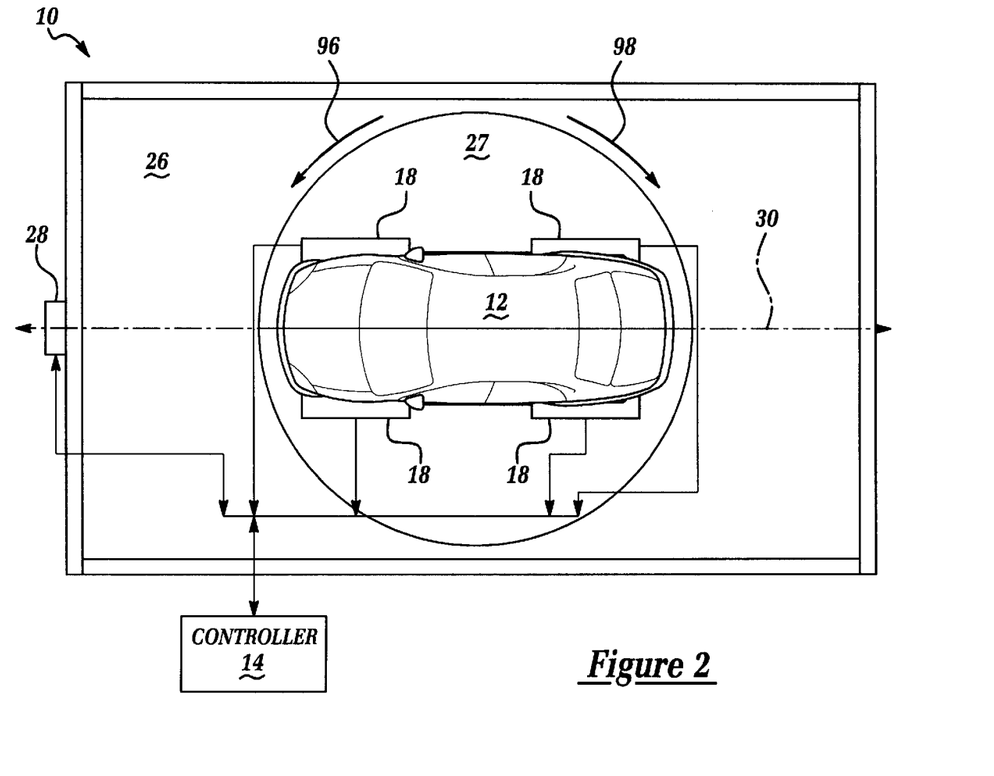
FIG. 2 is a top view of the apparatus shown in FIG. 1.
Figure 3:
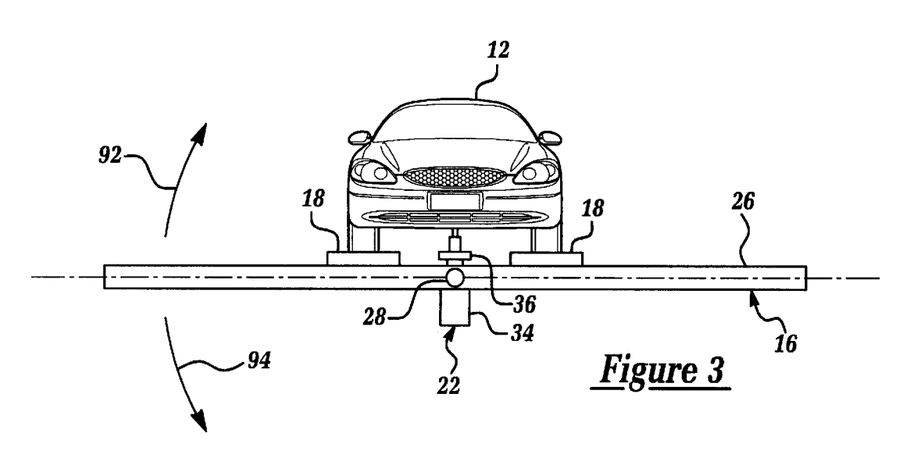
FIG. 3 is a front view of the apparatus shown in FIG. 1, illustrating the vehicle in a level position.
Figure 4:
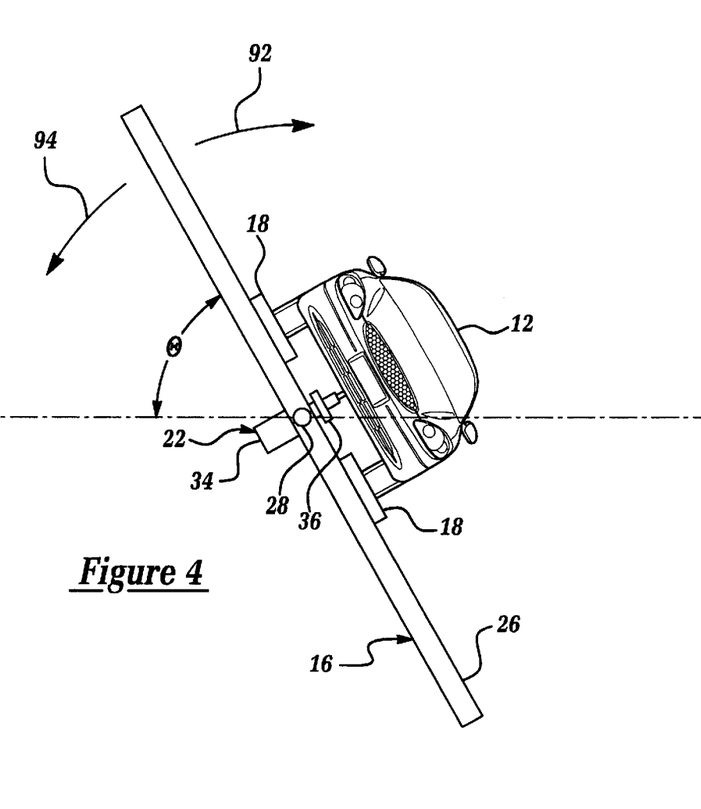
FIG. 4 is a front view of the apparatus shown in FIG. 1, illustrating the vehicle in an angled position.

Controller 14 is electrically, physically, and communicatively coupled to test bed assembly 16, sensors 18, actuators 20, gravity compensating assembly 22, and vehicle sensors 24. As described more fully and completely below, controller 14 controls the position and/or operation of test bed assembly 16, actuators 20, and compensation assembly 22, effective to cause test bed assembly 16, actuators 20 and compensation assembly 22 to replicate certain inertial conditions or events on vehicle 12. Controller 14 further receives signals from sensors 18 and 24, and utilizes the received signals to analyze and/or measure the rollover resistance of vehicle 12 and the dynamic or structural compliance characteristics of vehicle 12 during the replicated inertial conditions or events.

In the preferred embodiment, controller 14 may include one or more microprocessors or integrated circuits which perform one or more of the below-described calculations, algorithms and processes. In the preferred embodiment of the invention, controller 14 further includes a conventional memory unit including both permanent and temporary memory, and is adapted to and does store at least a portion of the operating software which performs the below-described operations. It should be appreciated that controller 14 may comprise several disparate chips or devices.

Figure 10:
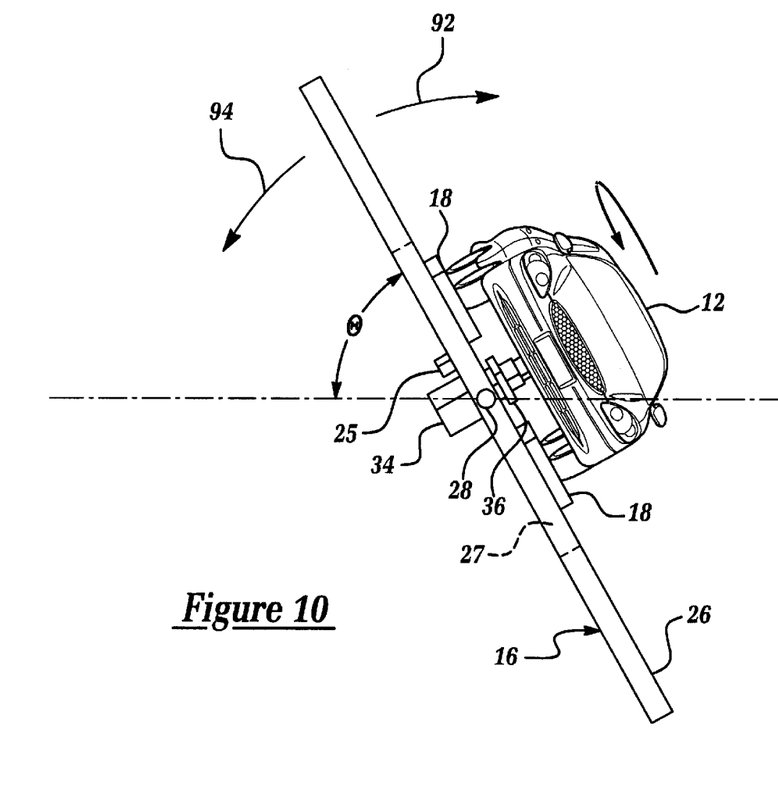
FIG. 10 is a front view of the apparatus shown in FIG. 1, illustrating the vehicle in an angled and rotated position.

Test bed assembly 16 includes a bed, platform or fixture portion 26 and a selectively controllable motor or hydraulic assembly 28 that is effective to cause bed portion 26 to be rotated about its longitudinal axis 30 and held in various angular positions. In alternate embodiments, test bed assembly 16 utilizes other conventional electrical, mechanical or hydraulic assemblies which allow bed portion 26 to be selectively disposed in various angular positions. Test bed assembly 16 further includes a generally circular revolving portion 27 which is disposed in the center of bed portion 26 and which selectively rotates relative to bed portion 26 (e.g., in the directions of arrows 96 and 98) while remaining in substantially the same plane as bed portion 26 (or in a parallel plane). A conventional motor assembly 25 is operatively coupled to portion 27 and is effective to cause the rotation of portion 27. Controller 14 is communicatively coupled to motor assemblies 28 and 25 and provides signals to motor assemblies 25, 28, effective to cause motor assembly 28 to tilt bed portion 26 at a particular angle θ with respect to ground (i.e., with respect to the horizontal), as shown best in FIG. 4, and to cause portion 27 to rotate a particular amount or angle relative to portion 26, as shown best in FIG. 10.

In the preferred embodiment, load sensors 18 comprise four conventional load pad sensors that are disposed upon test bed assembly 16. Sensors 18 are positioned to be operatively disposed under each of the tires of vehicle 12, and are adapted to measure the force or load provided by each tire in multiple axes (i.e., along the "X", "Y" and "Z" axes). Sensors 18 are selectively movable in both the "X" and "Y" axes and can be positioned in various locations on portion 27, thereby accommodating various vehicle wheel base lengths and track widths. Sensors 18 provide data representing the measured load values to controller 14, which utilizes these values to determine or estimate the resistance to rollover of vehicle 12.

Sensors 24 comprise conventional and commercially available vehicle attribute sensors, which measure and/or detect certain vehicle attributes and which transmit signals representing these values to controller 14. In the preferred embodiment, sensors 24 are adapted to measure various dynamic and/or structural compliance characteristics of the vehicle 12. These characteristics may include bushing displacements, stresses, strains, bending, twisting, body and suspension displacements and other compliance attributes or characteristics. It should be appreciated that sensors 18, 24 may include filtering and/or processing devices or circuits which filter and/or process their respective measured data prior to sending the data to controller 14.

Actuators 20 comprise conventional electric, mechanical and/or hydraulic expandable and retractable assemblies (e.g., cylinders and/or clamping members).

Actuators 20 are coupled to the vehicle's suspension and are effective to "jack" or displace the suspension by a certain distance or amount in order to simulate the position of the suspension during the inertial event that is being replicated. In the preferred embodiment, one actuator is used for each tire suspension assembly and is mounted in parallel with either the vehicle's shock absorbers or struts, depending on the vehicle's suspension type and configuration. The actuators 20 are selectively expandable and retractable, thereby allowing the suspension assemblies to be selectively extended and compressed.

Gravity compensating assembly 22 includes a mechanical linking member or structure 32, a hydraulic cylinder 34 and a load cell 36. Linking member 32 is an elongated member which is fixedly coupled to the vehicle's chassis in a conventional manner. In other alternate embodiments, linking member 32 may comprise any conventional mechanical assembly which is effective to couple the hydraulic cylinder 34 to vehicle 12. Hydraulic cylinder 34 is attached to linking member 32 and to test bed 26, and selectively provides a purely vertical force that is translated to vehicle 12. Cylinder 34 is positioned directly under the vehicle's center of gravity 90, and is designed to move with (i.e., track) the vehicle 12 as it translates laterally during tilting. Particularly, cylinder 34 is movably attached to test bed 26 in a conventional manner which allows it to adjust to the movements of vehicle 12 (e.g., cylinder 34 is slidably disposed within a track or groove formed in portion 27 of test bed 26). Controller 14 causes cylinder 34 to provide a "make-up" or compensation force that compensates for the loss of gravitational force (normal to test bed 26) as the vehicle 12 is tilted. The load cell 36 communicates signals to controller 14, thereby providing feedback to controller 14 regarding the precise downward force being applied to the vehicle 12. In other alternate embodiments, cylinder 34 may be replaced with any other type of suitable force providing member or assembly.

Figure 5:
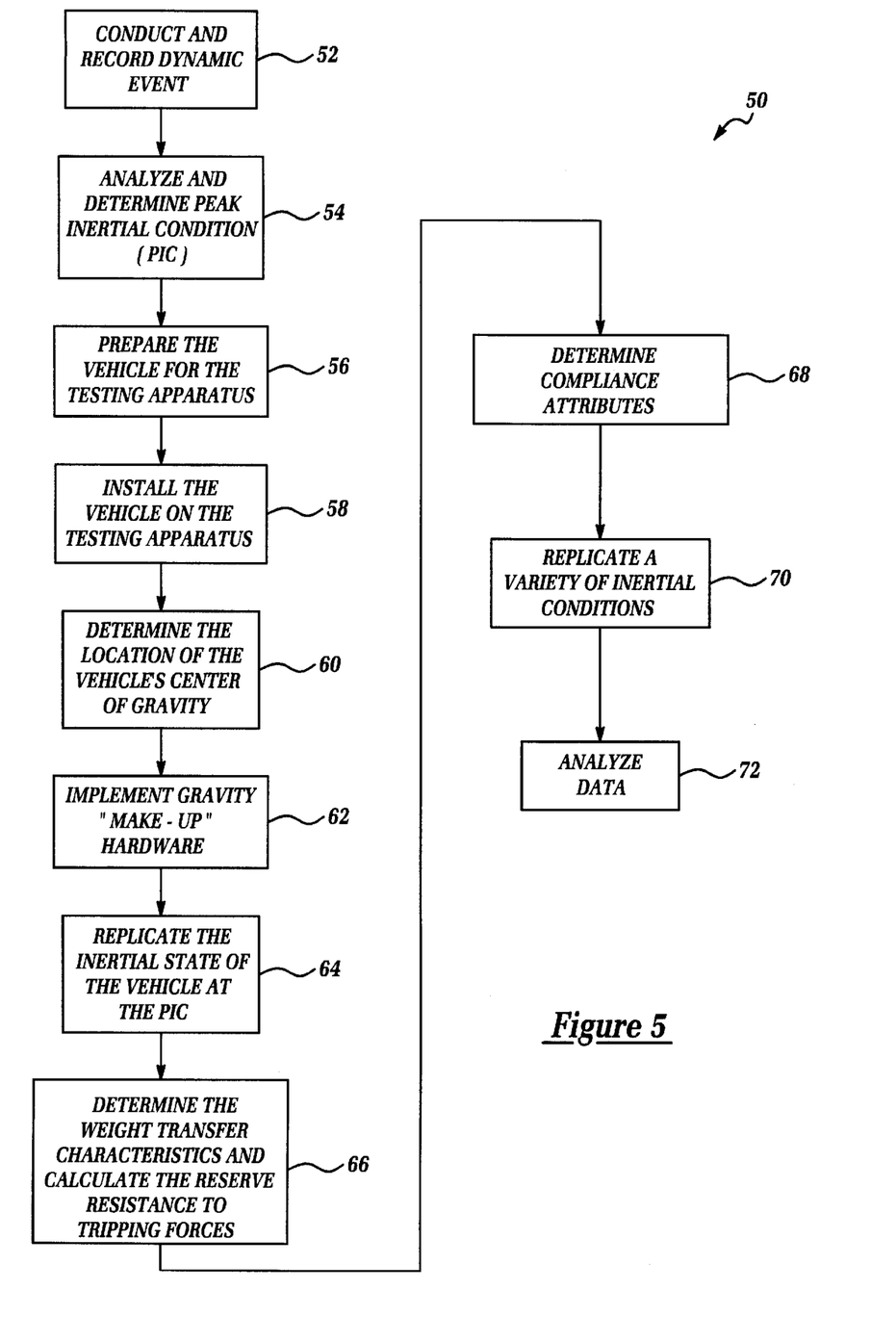
FIG. 5 is a block diagram illustrating a method which utilizes the apparatus shown in FIG. 1 to analyze the rollover resistance and compliance characteristics of a vehicle.

To understand the general operation of the apparatus 10, reference is now made to flow chart 50 of FIG. 5, which illustrates a method or strategy for measuring the resistance of vehicle 12 to rollover and the compliance characteristics of vehicle 12. Method 50 begins with functional block or step 52, where vehicle 12 undergoes various testing procedures. Particularly, vehicle 12 is tested in a conventional manner (e.g., on a test track) and is made to experience various dynamic or inertial events, such as lane changes, turns, and other procedures performed at various vehicle speeds, turning radii and other conditions. Prior to testing, the vehicle 12 is instrumented with various sensors which are used to acquire inertial condition information from vehicle 12. These sensors may include lateral ("Y" axis) acceleration sensors, longitudinal ("X" axis) acceleration sensors, vertical ("Z" axis) acceleration sensors, yaw rotation rate ($\Psi Z$) sensors, roll rotation rate ($\Psi X$) sensors, pitch rotation rate ($\Psi Y$) sensors, body height sensors, suspension displacement sensors (e.g., linear displacement transducers), steering wheel angle sensors, steering wheel torque sensors, vehicle speed sensors, vehicle slip angle sensors, and other vehicle attribute sensors. It should be appreciated that some of the foregoing sensors may be "combined" within a single sensor that may be used to estimate any one or more of the foregoing vehicle attributes. In step 52, a series of events are run or conducted on vehicle 12 and the sensory data is collected in a conventional manner.

The method 50 then proceeds to functional block or step 54, where one or more peak inertial conditions (PICs) are selected. Each PIC relates to a instance in time in which the vehicle's resistance to rollover is to be analyzed. The PICs are determined or selected based upon an analysis of the data obtained in step 52. In one non-limiting embodiment, PICs are selected based upon data identifying instances in time at which a rollover incident was imminent or likely to occur. Other instances in time may also be selected that correspond to particular inertial conditions or vehicle maneuvers that a user may wish to closely analyze. For example, such conditions may correspond to standards selected or adopted by corporate and/or governmental entities.

Figure 6:
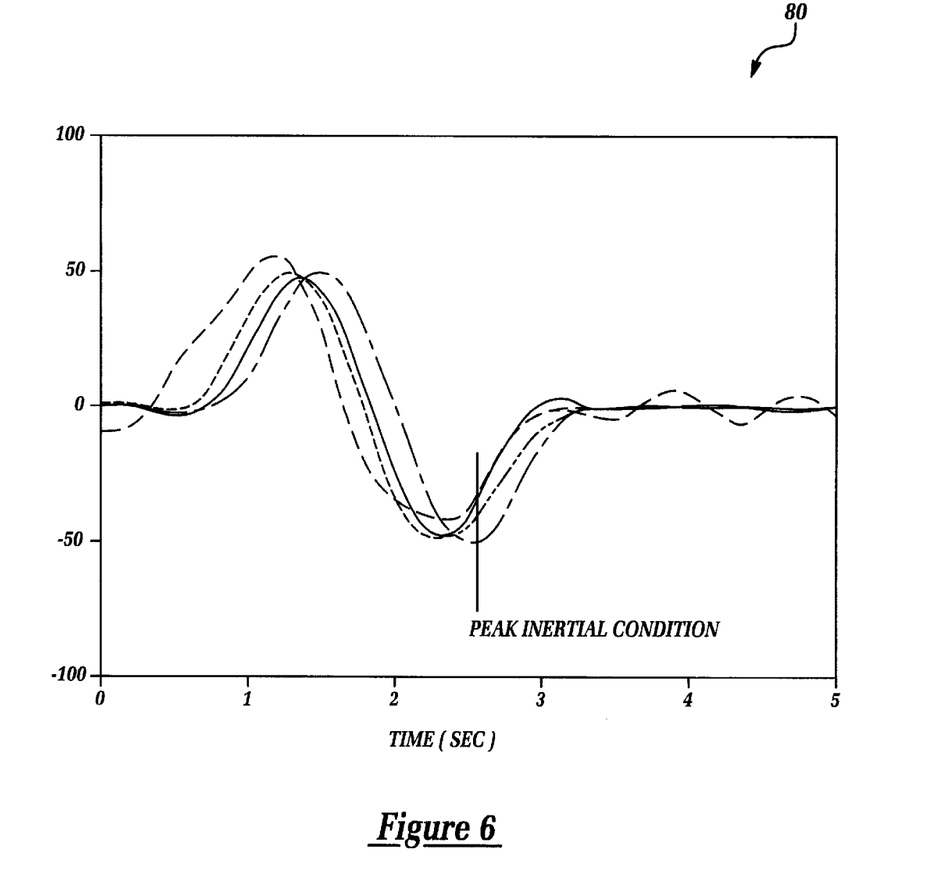
FIG. 6 is a graph illustrating an example of the lateral forces on a vehicle during an inertial event.

One example of a PIC that may be analyzed by the present apparatus 10 is shown in graph 80 of FIG. 6, which illustrates a plot of the lateral forces experienced by vehicle 12 during a lane change at sixty miles per hour. In one non-limiting embodiment, a conventional computer aided engineering system is used to determine or select the PICs and/or other inertial events that are to be fully analyzed. Once the PICs and/or other events are selected, the data obtained from the vehicle sensors at the instantaneous points in time when these PICs and/or other events occurred is saved and used to operate the apparatus 10.

In functional block or step 56, a user prepares the vehicle 12 for the testing apparatus 10. In the preferred embodiment, the actuators 20 are operatively attached to the vehicle 12, and the data obtained in step 54 is used to adjust the vehicle suspension to replicate the position of the suspension at the time of the PIC. Particularly, the data from step 54 is used to calculate the precise suspension displacement magnitudes that occurred at the PIC. In the preferred embodiment, controller 14 is connected to the actuators 20 and communicates signals to the actuators 20, effective to manipulate the vehicle's suspension in order to replicate the state of the suspension at the time of the PIC. Once engaged, the actuators 20 are effective to position the vehicle's suspension components at the exact displacements that occurred at the PIC and to prevent the suspension components from "jacking" during the following testing procedures (e.g., when the vehicle 12 is tilted). In one non-limiting embodiment, the engagement of actuators 20 occurs substantially simultaneously with the activation of the gravity compensation assembly 22, as described within step 62, and with the replication of the inertial state of the vehicle 12, as described within step 64.

Once the actuators 20 have been attached, the vehicle 12 is installed on the testing assembly 16, as shown in functional block or step 58. In the preferred embodiment, load sensors or pads 18 are positioned on platform portion 26 so that they are equidistant from the longitudinal axis 30 of testing assembly 16, and so that they correspond to the wheel base length and track width of vehicle 12. Hence, when vehicle 12 is placed on testing platform 26, each of the vehicle's wheels are positioned over a unique one of sensor pads 18. In one non-limiting embodiment, vehicle 12 may be protected or secured during this step by use of conventional failsafe mechanisms.

Figure 7:
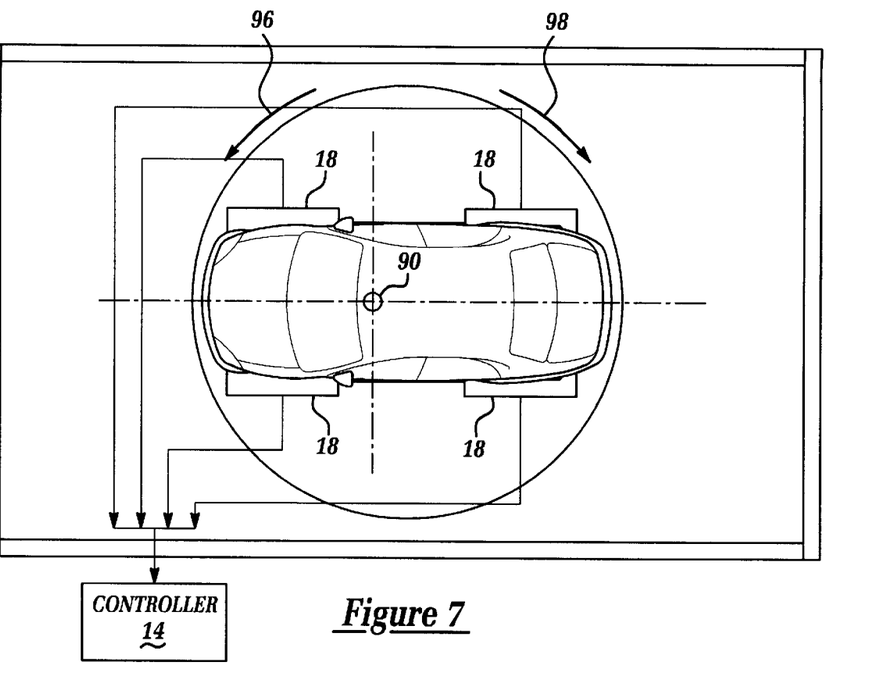
FIG. 7 is a top view of the apparatus shown in FIG. 1, illustrating the determination of the location of the vehicle's center of gravity in the "X" and "Y" axes.
Figure 8:
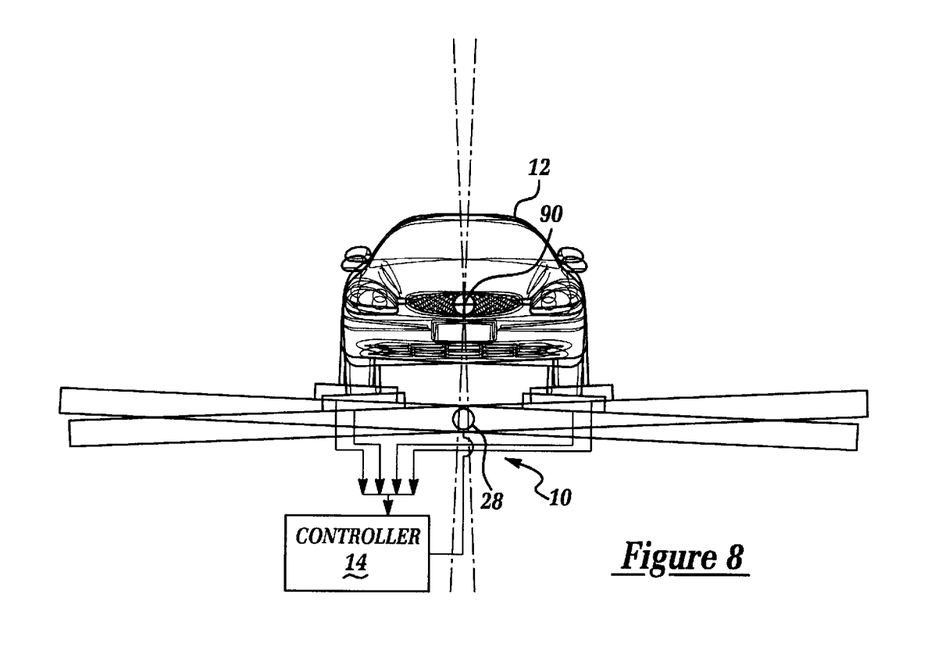
FIG. 8 is a front view of the apparatus shown in FIG. 1, illustrating the determination of the vehicle's center of gravity in the "Z" axis.

Once the vehicle is placed on the fixture, the controller 14 uses sensor pads 18 to calculate the location of the vehicle's center of gravity with respect to the "X" and "Y" axes. As shown best in FIG. 7, the X-Y location of the center of gravity 90 is determined by measuring the vertical loads observed at each load sensor 18, and using conventional algorithms to determine the location based upon the measured loads and the positions of the sensors 18 and/or the measured loads. Controller 14 then determines the location of center of gravity 90 in the "Z" axis. In the preferred embodiment of the invention, the "Z" coordinate of the center of gravity 90 is determined by use of a low angle tilt test. As shown best in FIG. 8, controller 14 communicates signals to motor assembly 28 effective to tilt the platform 26 and vehicle 12 about axis 30 plus and minus a predetermined number of degrees (e.g., 3 degrees). The observed load transfer between sensors 18 is then used in a conventional manner to calculate the "height" or "Z" coordinate of the center of gravity 90. In the preferred embodiment of the invention, during the foregoing tilt test, the load sensors 18 are rotationally adjusted relative to portion 27 in order to keep the sensors 18 level during the test.

Once the center of gravity 90 is located, the gravity compensation assembly 22 is implemented, as shown in step 62. Particularly, the linking member 32 is operatively attached to the vehicle's chassis and the hydraulic cylinder 34 is operatively attached to the platform portion 26 and to the linking member 32 directly under the vehicle's center of gravity 90.

A user then proceeds to step 64 and uses controller 14 to replicate the inertial state of the vehicle 12 at the selected PIC. Controller 14 accesses the data obtained during step 52 to replicate the inertial forces that were experienced by the vehicle at the PIC. Controller 14 uses this data to rotate platform 26 about longitudinal axis 30 in the direction of arrow 92 or 94, as shown best in FIG. 4, thus exposing the vehicle to progressively increasing forces. Based upon this data, controller 14 may also concomitantly rotate portion 27 relative to platform 26 in the directions of arrow 96 or 98, as shown best in FIG. 10. The magnitude and direction of the force required to replicate the forces experienced by the vehicle at the PIC will determine the target angle θ at which the platform 26 is positioned and the amount of rotation provided to portion 27. As the vehicle 12 is moved to the correct angular position θ, the controller 14 activates cylinder 34 to provide a vertical force at the center of gravity 90 that compensates or "makes-up" for the loss of gravitational force due to the angle θ of platform 26. This compensating force is determined or calculated by controller 14 using conventional algorithms. As the platform 26 is tilted, "jacking" of the suspension is prevented by the actuators 20, and the force exerted by the gravity compensation assembly 22.

In this manner, apparatus 10 fully and accurately replicates the forces on vehicle 12 at the PIC. Essentially, apparatus 10 allows the PIC to be replicated for an indefinite period of time during which a user may analyze various vehicle attributes. For example and without limitation, once the vehicle is positioned to replicate the PIC, a user can obtain weight transfer characteristics as shown in step 66 and determine the vehicle's resistance to rollover at the PIC. In step 66, controller 14 uses sensors 18 to measure the loads at each of the vehicle's tires (i.e., the loads exerted by each of the tires). These loads can be used to analyze the resistance to rollover of the vehicle 12 at the PIC. For example and without limitation, the greater the magnitude of the load transfer between the vehicle's wheels, as indicated by sensors 18, the more vulnerable the vehicle 12 is to tripping forces. This information may be used for computer aided engineering model validation for both rollover and compliance attributes.

It should be appreciated that certain inertial and dynamic phenomena may not be fully replicated for particular types of events. In such cases, additional assemblies and/or functions may be added to apparatus 10 without departing from the spirit and scope of the present invention. For example and without limitation, in order to better replicate certain suspension attributes that may be present during an inertial event, controller 14 may generate modulated signals to actuators 20 effective to induce a level of vibration or oscillation within the suspension of vehicle 12 to overcome latent friction. Additionally, in order to better replicate events which require in excess of one gravitational unit of force (i.e., one "G"), an additional apparatus may be attached to the vehicle 12 or the entire test bed 26 may be modified to move vertically at a certain speed or acceleration.

In step 68, the vehicle's compliance attributes are measured in a conventional manner. Particularly, sensors 24 are used to measure bushing displacements, stresses, strains, bending, twisting, body and suspension displacements and other compliance attributes or characteristics. Apparatus 10 provides significant improvements in measuring compliance attributes relative to prior systems and methods, such as conventional kinematics and compliance machines. For example and without limitation, in the present apparatus, the vehicle 12 suffers no significant change in structural characteristics due to the addition of fixture hardware and hold-down devices common to prior systems. Hence, the vehicle frame and body are free to move, bend, twist and rotate just as they did on the test track. Furthermore, the method used to impart inertial forces upon the vehicle is completely natural and uncontrived. The testing apparatus 10 is designed to replicate the inertial forces measured during the test track event. When the forces are reproduced on the testing apparatus 10, they act upon the vehicle's center of gravity 90 accurately and naturally. Finally, all forces that are applied to the vehicle 12 are based upon the experience of an actual road event.

Figure 9:
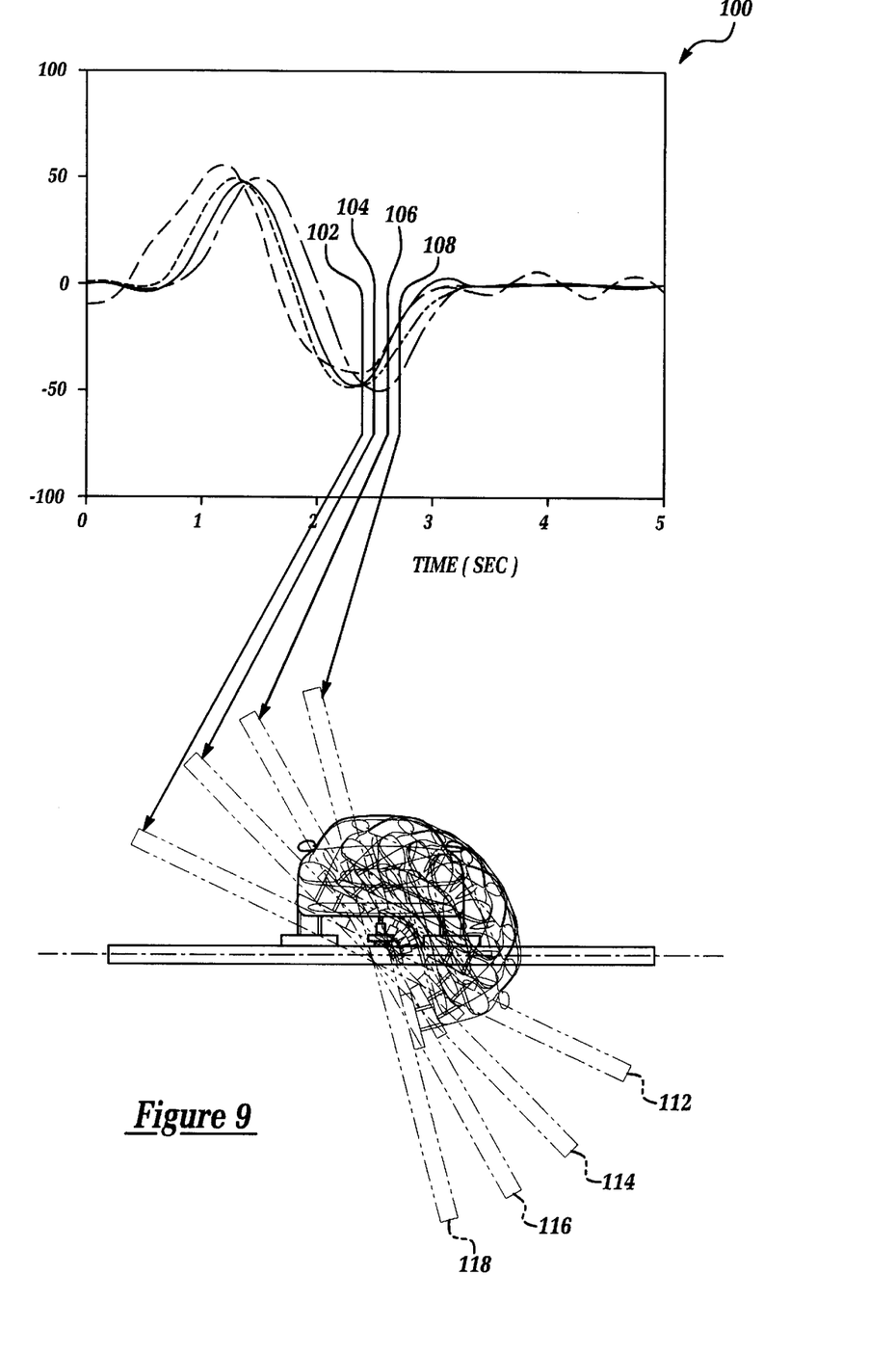
FIG. 9 is a front view of the apparatus shown in FIG. 1, illustrating the replication of a variety of inertial conditions.

In functional block or step 70, a user may replicate a number of other PICs or inertial events in order to further study and analyze the vehicle's resistance to rollover and compliance characteristics. A user may enter or identify any desired target events or inertial conditions within controller 14 and use controller 14, actuators 20, gravity compensation assembly 22, and test assembly 16 to replicate the suspension jacking and the forces imparted upon vehicle 12 during those events. FIG. 9 illustrates several inertial events 102, 104, 106, 108 which are graphically represented in graph 100. Several positions 112, 114, 116, and 118 of testing assembly 16 are shown in phantom in FIG. 9 and respectively correspond to and/or replicate the forces on vehicle 12 during inertial events 102, 104, 106 and 108. The vehicle's rollover resistance and compliance characteristics are measured and recorded at these various replicated inertial events. In step 72, the data obtained in steps 64–70 is used to analyze the vehicle's overall resistance to rollover and compliance issues. By isolating and replicating various inertial events, a user can obtain a fuller understanding of a vehicle's rollover resistance and compliance attributes and of how such characteristics may be improved.

It is understood that the various inventions are not limited to the exact construction illustrated and described above, but that these previously delineated inventions may be varied without departing from the scope of the inventions as described in the following claims.

What is claimed is:

1. An apparatus for measuring attributes of a vehicle during a certain inertial event, said vehicle having a plurality of tires and a suspension assembly, said apparatus comprising:

a test platform on which said vehicle is placed and which is selectively and rotatably positionable in an angular position based upon said certain inertial event;

a plurality of load sensors which are each disposed under a unique one of said plurality of tires and which provide data regarding loads exerted by said plurality of tires;

a plurality of actuators which are attached to said suspension assembly and which are adapted to selectively hold said suspension assembly in certain position; and a compensation assembly which is attached to said test platform and to said vehicle, said compensation assembly being effective to selectively provide a force to said vehicle that compensates for a loss of gravitational force that is experienced by said vehicle when said test platform resides in said angular position, thereby cooperating with said test platform to accurately replicate forces that were imparted upon said vehicle during said certain inertial event and allowing said attributes to be measured.

2. The apparatus of claim 1 further comprising a controller which is communicatively connected to said plurality of load sensors and to said compensation assembly, said controller being effective to receive said data from said plurality of load sensors and to cause said compensation assembly to provide said force to said vehicle.

3. The apparatus of claim 2 wherein said force is substantially vertical.

4. The apparatus of claim 2 wherein said controller is effective to determine a rollover resistance of said vehicle based upon said received data.

5. The apparatus of claim 4 further comprising:
a plurality of vehicle attribute sensors which are operatively disposed on said vehicle and which are effective to measure said attributes of said vehicle when said test platform is in said angular position.

6. The apparatus of claim 1 wherein said test platform comprises a generally circular portion on which said vehicle is placed, said circular portion being selectively rotatable relative to said test platform.

7. The apparatus of claim 2 wherein said compensation assembly comprises a hydraulic cylinder.

8. The apparatus of claim 1 wherein said vehicle has a center of gravity and wherein said compensation assembly is coupled to said vehicle directly below said center of gravity.

9. A system for measuring attributes of a vehicle having a suspension assembly, said system comprising:
a test bed assembly on which said vehicle is placed and which is selectively and rotatably positionable in a plurality of angular positions;
a plurality of actuators which are attached to said suspension assembly and which are adapted to selectively hold said suspension assembly in a plurality of states;
a compensation assembly which is attached to said test bed assembly and to said vehicle, said compensation assembly being effective to selectively provide forces to said vehicle that compensate for a loss of gravitational force that is experienced by said vehicle when said test bed assembly resides in any of said angular positions; and
a controller which is communicatively coupled to said test bed assembly, to said plurality of actuators, and to said compensation assembly, said controller being effective to receive data regarding a certain inertial event experienced by said vehicle, and based upon said received data, to cause said test bed assembly to move to a selected angular position, to cause said plurality of actuators to hold said suspension assembly in a selected state, and to cause said compensation assembly to provide a selected force to said vehicle, thereby accurately replicating said certain inertial event on said vehicle.

10. The system of claim 9 further comprising:
at least one sensor which is adapted to selectively measure a vehicle attribute.

11. The system of claim 10 wherein said vehicle further includes a plurality of wheels and wherein said at least one sensor comprises a plurality of load sensors which are each disposed under a unique one of said plurality of wheels and which provide data regarding loads exerted by said plurality of wheels.

12. A method for measuring certain attributes of a vehicle, said vehicle having a suspension assembly, said method comprising the steps of:
causing said vehicle to experience an inertial event;
measuring lateral forces on said vehicle when said vehicle experiences said inertial event;
monitoring a position of said suspension assembly when said vehicle experiences said inertial event;
holding said suspension assembly in said position;
placing said vehicle on a test fixture having a longitudinal axis;
rotating said test fixture about said longitudinal axis to a certain angular position effective to replicate said measured lateral forces;
imparting a vertical force on said vehicle effective to compensate for a loss of gravitational force that is experienced by said vehicle when said test fixture resides in said angular position; and
measuring and analyzing said certain attributes of said vehicle.

13. The method of claim 12 wherein said certain attributes comprise a rollover resistance of said vehicle.

14. The method of claim 13 wherein said vehicle has a plurality of wheels and wherein said rollover resistance is determined by measuring loads exerted by each of said plurality of wheels.

15. The method of claim 12 further comprising the steps of:
locating a center of gravity of said vehicle; and
wherein said vertical force is imparted to said vehicle directly under said center of gravity.

16. The method of claim 15 wherein said vertical force is imparted by use of a hydraulic cylinder.

17. The method of claim 16 wherein said hydraulic cylinder is selectively movable relative to said test fixture, thereby allowing said hydraulic cylinder to track movement of said center of gravity.

18. The method of claim 13 wherein said certain attributes further comprise compliance attributes of said vehicle.

19. The method of claim 12 further comprising the step of:
rotating said vehicle relative to said test fixture.

* * * * *